(12) United States Patent
Maes et al.

(10) Patent No.: US 6,533,842 B1
(45) Date of Patent: Mar. 18, 2003

(54) ADSORPTION POWDER FOR REMOVING MERCURY FROM HIGH TEMPERATURE, HIGH MOISTURE GAS STREAMS

(75) Inventors: Rudy J. Maes, Easton, PA (US); Youssef El-Shoubary, North Brunswick, NJ (US); Subash Seth, Watchung, NJ (US)

(73) Assignee: Merck & Co., Inc., Rahway, NJ (US)

( * ) Notice: Subject to any disclaimer, the term of this patent is extended or adjusted under 35 U.S.C. 154(b) by 0 days.

(21) Appl. No.: 09/512,409

(22) Filed: Feb. 24, 2000

(51) Int. Cl.[7] .............................................. B01D 53/04
(52) U.S. Cl. ........................... 95/134; 95/141; 95/900; 96/108
(58) Field of Search .................. 95/133, 134, 141, 95/142, 900; 96/108, 132, 135, 136, 154; 423/210

(56) References Cited

U.S. PATENT DOCUMENTS

| | | | |
|---|---|---|---|
| 1,984,164 A | * 12/1934 | Stock | 423/210 |
| 3,193,987 A | * 7/1965 | Manes et al. | 423/210 |
| 3,194,629 A | * 7/1965 | Dreibelbis et al. | 423/210 |
| 3,786,619 A | 1/1974 | Melkersson et al. | |
| 3,876,393 A | 4/1975 | Kasai et al. | |
| 3,956,458 A | * 5/1976 | Anderson | 423/210 |
| 4,094,777 A | 6/1978 | Sugier et al. | |
| 4,273,747 A | * 6/1981 | Rasmussen | 423/210 |
| 4,889,698 A | * 12/1989 | Moller et al. | 95/134 X |
| 5,330,560 A | * 7/1994 | Chao et al. | 95/133 X |
| 5,409,522 A | 4/1995 | Durham et al. | |
| 5,456,891 A | * 10/1995 | Fattinger et al. | 423/210 |
| 5,502,021 A | * 3/1996 | Schuster | 423/210 X |
| 5,505,766 A | 4/1996 | Chang | |
| 5,507,238 A | * 4/1996 | Knowles | 423/210 X |
| 5,569,436 A | * 10/1996 | Lerner | 423/210 X |
| 5,575,982 A | * 11/1996 | Reiss et al. | 423/210 |
| 5,607,496 A | 3/1997 | Brooks | |
| 5,659,110 A | * 8/1997 | Herden et al. | 423/210 X |
| 5,827,352 A | 10/1998 | Altman et al. | |
| 6,033,461 A | * 3/2000 | Yang et al. | 95/900 X |

FOREIGN PATENT DOCUMENTS

| | | | | |
|---|---|---|---|---|
| JP | 49-053593 | * | 5/1974 | 95/134 |
| SU | 0480434 | * | 11/1976 | 95/134 |
| SU | 1161157 | * | 6/1985 | 95/134 |
| SU | 1163892 | * | 6/1985 | 95/134 |

* cited by examiner

Primary Examiner—Robert H. Spitzer
(74) Attorney, Agent, or Firm—James M. Hunter, Jr.; Mark R. Daniel

(57) ABSTRACT

There is disclosed an adsorption powder effective for capturing mercury from a high temperature, high moisture gas stream comprising: about 1–97% carbon; about 1–97% calcium hydroxide; about 1–97% cupric chloride impregnated carbon, and about 1–60% carbon impregnated with $KI_3$. Additionally, a method of removing mercury from high temperature, high moisture gas streams is disclosed.

6 Claims, 1 Drawing Sheet

ADSORPTION POWDER FOR REMOVING MERCURY FROM HIGH TEMPERATURE, HIGH MOISTURE GAS STREAMS

BACKGROUND OF THE INVENTION

The present invention relates generally to removal of pollutants from high temperature, high moisture gas streams such as those found in devices designed to treat contaminated soil and in hazardous material incinerators. More particularly, the invention relates to the capture of mercury and other metals, dioxins, furans and other organic compounds from high temperature, high moisture gas streams using an adsorption powder containing cupric chloride.

Strict standards exist for particulate and total mercury emissions by coal-fired power plants, petroleum refineries, chemical refineries, coal fired furnaces, trash burning facilities, incinerators, metallurgical operations, thermal treatment units and other particulate and mercury emitting facilities. These same restrictions apply to mercury vapor, which can enter the atmosphere as a result of low temperature thermal desorption (LTTD) treatment of contaminated soils.

These stringent standards exist in order to protect the environment and the community. When mercury-containing gases are released, the gases disperse and mercury is deposited over a wide area. The dispersed mercury can accumulate in the soil or water supplies, where it may be incorporated into the food chain. Mercury is extremely harmful to aquatic life and ultimately to the humans who consume mercury-contaminated plants and animals. It is necessary, therefore, to have a safe and effective method of eliminating mercury from the environment.

The problem of the capture and treatment of mercury vapor, typically in the context of coal-fired power plants and waste incinerators, has been previously considered. For example, U.S. Pat. No. 3,193,987 discloses passing mercury-containing vapor over activated carbon impregnated with a metal which forms an amalgam with mercury. U.S. Pat. No. 4,094,777 discloses passing a mercury-containing vapor over an adsorption mass consisting essentially of a support, sulfided copper and sulfided silver. U.S. Pat. No. 3,876,393 discloses passing mercury-containing vapors over activated carbon that has been impregnated with sulfuric acid. Selenium has also been used in the removal of mercury from a vapor. U.S. Pat. No. 3,786,619 discloses passing a mercury-containing gas over a mass containing as an active component, selenium, selenium sulfide or other selenium compounds. Electrostatic precipitators and various filters have traditionally been used for mercury removal, although complex apparatus have also been disclosed. (See e.g., U.S. Pat. Nos. 5,409,522 and 5,607,496.)

The problem of recapturing mercury from power plant gas streams is analogous to the need for recapturing mercury from incinerators that treat contaminated soils. A process currently in use at soil treatment facilities is known as low temperature thermal desorption (LTTD). LTTD is the main process by which contaminated soils are treated to remove mercury and other contaminants. In this process, contaminated soils are fed into a heating furnace, most commonly a rotary kiln/drum, where the soil is heated by conduction. The heating volatizes the soil components and when a thermal oxidizer is added, the components are oxidized to manageable gases, such as $CO_2$, $Cl_2$, $NO_x$ and $SO_x$, where x is 1–3.

The hot gas stream is subsequently cooled. The stream may be quenched with water, which cools the stream and concurrently increases the moisture content. Although water quenching is a highly effective cooling method, this treatment increases the difficulty of removing mercury from the gas stream. The gas stream is further treated to reduce and remove metals, HCl, $NO_x$ and $SO_x$ using acid scrubbers, carbon beds, condensation units and through the addition of adsorption powders.

When adsorption powders are injected into the gas stream, mercury and other metals bind to moieties present in the powder, precipitating them from the gas stream. The powder-bound mercury is ultimately collected in a bag house for appropriate disposal, while the clean gas stream is exhausted to the outside atmosphere. The problem with standard LTTD methods is that some metals, such as mercury, are not removed from the stream at high efficiency and will move with the gas stream, ultimately into the environment. Other methods require the use of complex machinery and expensive adsorption beds. LTTD and other methods also suffer from the limitation that mercury removal from high moisture gas streams is much more difficult than mercury removal from dry streams.

Available adsorption powders remove organics, metals and other contaminants, but they do not effectively remove mercury. For example, one available powder (Sorbalite™) consisting of carbon, calcium hydroxide and sulfur removes HCl from a gas stream, but removes only about 55–65% of the mercury. Another powder (WUELFRAsorb-C™) consisting of alcohol saturated lime and activated carbon is also inefficient at removing mercury.

Some powders include sulfur or iodine impregnated carbon. At temperatures of 75° C. or less, sulfur or iodine impregnated carbon based powders show a 95% mercury removal efficiency, however, powders formulated with sulfur impregnated carbon require a dry or low moisture gas stream to show this level of removal.

Finally, the mercury removal efficiency of the powders described and other available powders is known to be very temperature dependent, placing an additional limitation on powder formulations.

A pending application describing a process from the same inventors involved the use of solid fine cupric chloride that is not impregnated on carbon. This was found to be more difficult to handle because of the grinding process required to pulverize the cupric chloride which is generally provided in rock sizes. The grinding process requires a great amount of attention due to the dust production and associated heath hazards. Additionally, the powder is very corrosive and results in breakdown of the machinery used in the process.

Accordingly, there is a need in the industry for an adsorption powder that effectively removes metals and other organic compounds, in general, and mercury, in particular, from high temperature, high moisture gas streams generated by the incineration of contaminated soils, treatment of hazardous materials, combustion of coal and other mercury liberating sources. The powder must be inexpensive and easy to use. Ideally, such an adsorption powder can be employed at treatment facilities already in place and can take advantage of equipment already in position, without requiring retooling or reconfiguring existing equipment.

SUMMARY OF THE INVENTION

There is disclosed an adsorption powder and method for removing mercury and other metals and contaminants from a high temperature, high moisture gas stream comprising: about 1–97% carbon; about 1–97% calcium hydroxide; about 1–97% cupric chloride impregnated carbon and about 1–60% KI$_3$ impregnated carbon. A method for removing mercury and other metals, dioxins, furans and other organic compounds from high temperature, high moisture gas streams using the claimed powder is also disclosed.

BRIEF DESCRIPTION OF THE DRAWINGS

The instant invention will be more fully understood in the following detailed description, it being understood, however, that the invention is not confined to the precise disclosure. Changes and modifications may be made that do not affect the spirit of the invention, nor exceed the scope thereof, as expressed in the appended claims. Accordingly, the instant invention will now be described with particular reference to the accompanying drawings.

DETAILED DESCRIPTION OF THE INVENTION

Figure 1:
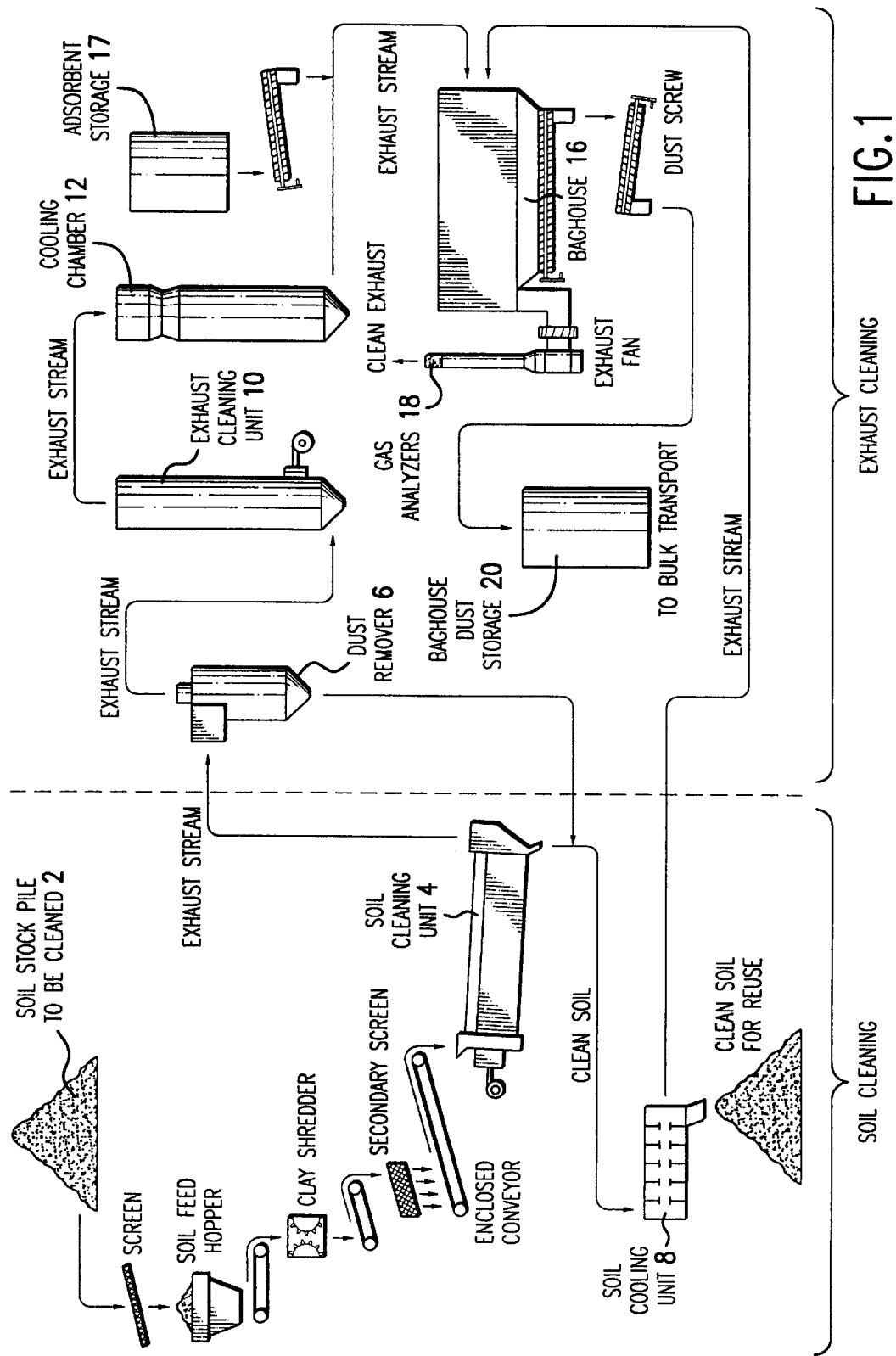
FIG. 1 is a schematic diagram illustrating the design of an LTTD facility in which the claimed adsorption powder can be used to remove mercury from gas streams.

There is disclosed an adsorption powder for removing mercury and other metals from a gas stream comprising:
a) about 1–97% carbon;
b) about 1–97% calcium hydroxide;
c) about 1–97% cupric chloride impregnated carbon; and
d) about 1–60% KI$_3$ impregnated carbon.

The powder more particularly comprises about 10–70% carbon, about 20–80% calcium hydroxide, about 1–50% cupric chloride impregnated carbon and about 1–50% KI$_3$ impregnated carbon. A preferred adsorption powder comprises about 20–60% carbon, about 30–70% calcium hydroxide, about 1–30% cupric chloride impregnated carbon and about 1–30% KI$_3$ impregnated carbon.

In a more preferred embodiment, the adsorption powder comprises about 25–45% carbon, about 40–60% calcium hydroxide, about 1–15% cupric chloride impregnated carbon and about 1–15% KI$_3$ impregnated carbon. The most preferred embodiment comprises about 40% carbon, about 40% calcium hydroxide, about 10% cupric chloride impregnated carbon and about 10% KI$_3$ impregnated carbon.

The use of the KI$_3$ impregnated carbon has been found to be optional as the powder lacking this component performed equally as well as one containing the KI$_3$ impregnated carbon.

Thus, in another embodiment of the invention, the adsorption powder comprises about 10–70% carbon, about 20–80% calcium hydroxide and about 1–50% cupric chloride impregnated carbon.

There is also disclosed a process for removing mercury from a gas stream using the adsorption powder of the invention comprising the steps of:
a) placing a solid phase mercury-containing contaminated soil feed into a rotary kiln/drum;
b) heating said kiln/drum containing said soil feed to form gaseous and solid components of the sample;
c) transferring the gaseous component of said soil feed to an exhaust cleaning unit/afterburner and the solid component of clean soil to a soil cooling unit;
d) heating the gaseous component of said contaminated soil feed in said exhaust cleaning unit/afterburner;
e) cooling the gaseous component of said contaminated soil feed;
f) adding the adsorption powder of the invention to the gaseous component;
g) transferring the powder-containing gaseous component to a baghouse; and
h) releasing the substantially mercury-free gaseous component of said sample to the atmosphere.

An adsorption powder for the removal of mercury and other metals, dioxins, furans and other organic compounds must be efficient under a range of conditions. Currently available powders do not function well at high temperatures and in high moisture environments, conditions that are favorable to mercury removal.

High temperatures are necessary for effective removal of contaminants from soil. Temperatures of about 1800° F. are necessary to volatize organics, metals and other impurities from the contaminated soil. Mercury that is trapped in contaminated soil, however, is most efficiently adsorbed on carbon at about 300–500° F. The most practical method of cooling a gas stream exiting an 1800° F. oven is to inject water into the gas stream. Water injection cools the gas stream to a temperature favorable to mercury removal, but also increases the moisture content of the sample, which decreases the efficiency of available mercury adsorption powders. The mercury absorbing properties of available powders suffer dramatically in a high moisture environment. The adsorption powder of the invention, however, operates effectively even in a higher moisture environment.

Experiments with carbon sources showed that coal carbon was superior to wood carbon for mercury adsorption. Many available adsorption powders use wood carbon as a component, rather than coal carbon. Cupric chloride was observed to significantly enhance the adsorption of mercury from a gas stream and is the key to the instant invention. Cupric chloride supplies chlorine and activated copper to the elemental mercury in the exhaust stream. Elemental mercury reacts with the chlorine to form mercury chloride and the activated copper to form a stable mercury amalgam. Both forms of mercury are easily captured from the exhaust gas stream. KI$_3$ impregnated carbon was also found to increase mercury adsorption when it was included in the powder.

FIG. 1 shows a schematic diagram of the actual process and equipment used to carry out the invention. Prescreened contaminated feed soil ready to be processed 2 is placed within soil cleaning unit 4. The contaminated soil is heated to about 900° F. or a temperature that will completely volatize the contaminates from the soil and generate a gas stream, as well as a clean/remediated solid soil component. Preferably, soil cleaning unit 4 is a rotary kiln. The gas stream is then passed out of soil cleaning unit 4 to dust remover 6, while any solid fraction of the feed soil is transferred to clean soil cooling unit 8, where the soil is cooled and prepared for reuse. Dust remover 6 is preferably a multi-tube dust collector.

After dust remover 6 removes any particulate matter from the gas stream sample, the gas stream is passed into the Exhaust Cleaning Unit 10. The Exhaust Cleaning Unit heats the volatilized contaminates to a temperature of about 1800° F. for a minimum of two seconds retention time, which assures complete destruction of any remaining organic or other contaminants. From the Exhaust Cleaning Unit 10, the gas stream then passes through cooling chamber 12 wherein a water pump (not shown) injects water into the cooling chamber 12 to lower the temperature of the sample to about 360° F. This cooling process consequentially increases the moisture content of the sample.

The high temperature, high moisture gas stream is then contacted to the adsorption powder of the invention, which is stored in adsorbent storage silo 14 and injected into the gas stream. This powder formulation is effective in removing metals, particularly mercury, and other contaminants.

After the gas stream has been contacted to the adsorption powder, the powder/gas stream mixture continues on to baghouse 16. The carbon component of the adsorption powder collects on the walls of bags and acts as a particulate filter for the gases leaving the baghouse. Baghouse 16 collects the particulate mercury-containing fraction of the adsorption powder mixture, which is transported to a suitable bulk storage facility 20 and subsequently removed. The gaseous fraction is released to the outside atmosphere through vent 18, while the remaining dust particulate fraction is handled in a similar manner to the particulate mercury fraction of the adsorption powder mixture 20.

EXAMPLE 1

A series of field tests were performed employing a preferred adsorption powder formulation. Three soil samples containing about 4.2 mg/kg of mercury were prepared by screening to 1 inch. The coarse material was discarded, and the remaining soil was fed into a soil cleaning unit and heated to about 900° F. The cleaned soil was transferred to a soil cooling unit and prepared for reuse. The exhaust stream was sent to a dust remover and the precipitated material was sent to the soil cooling unit. The exhaust stream was then fed into an exhaust cleaning unit, which was heated to about 1850° F. The exhaust gas was then cooled to about 360° F. by quenching with, water, and subsequently an adsorption powder comprising 40% coal carbon, 10% $KI_3$ impregnated carbon, 40% calcium hydroxide and 10% cupric chloride impregnated carbon was added. The exhaust stream/adsorption powder mixture was fed into a baghouse, where the mercury-bound particulate was separated from the mercury-free exhaust gas. The particulate material was removed from the baghouse for analysis and disposal, while gas analyzers on the exhaust stack recorded mercury emission levels. The results of the three, two hour runs are reported in the following table.

|  | Run 1 | Run 2 | Run 3 | Average |
|---|---|---|---|---|
| LTTD Mercury Input (lbs/hr) | 0.193 | 0.199 | 0.199 | 0.197 |
| Clean Soil Mercury Output (lbs/hr) | 0.0020 | 0.0020 | 0.0020 | 0.0020 |
| Mercury Emission Rate (lbs/hr) | 0.0012 | 0.0006 | 0.0007 | 0.0008 |
| Mercury Removal Efficiency[1] | 99.4% | 99.7% | 99.6% | 99.6% |

[1]Removal Efficiency (%) = (Mass input − Stack Output − Clean Soil Output)/(Mass Input − Clean Soil Output)

The average mercury removal efficiency of 99.6% exceeds the current mercury control efficiency specification of 96.5% efficiency, set by NJDEP air permit legislation. Mercury emissions were determined by EPA method 29-060.

Although the adsorption powder and method described and claimed are presented in the context of mercury removal from a gas stream, it should be appreciated that the powder and method are also useful for removing organics, metals and other contaminants from a gas stream.

What is claimed is:

1. An adsorption powder for removing mercury and other metals, dioxins, furans and other organic compounds from a gas stream, comprising:
    a) about 40% carbon;
    b) about 40% calcium hydroxide;
    c) about 10% cupric chloride; and
    d) about 10% $KI_3$ impregnated carbon.

2. The adsorption powder of claim 1 wherein the carbon is coal carbon.

3. The adsorption powder of claim 1, wherein the carbon is selected from the group consisting of coal and wood.

4. A method for removing mercury and other metals, dioxins, furans and other organic compounds from a gas stream using the adsorption powder of claim 1 comprising the steps of:
    a) placing a solid phase mercury-containing contaminated soil feed into a rotary kiln/drum;
    b) heating said kiln/drum containing said soil feed to form gaseous and solid components of the sample;
    c) transferring the gaseous component of said soil feed to an exhaust cleaning unit/afterburner and the solid component of clean soil to a soil cooling unit;
    d) heating the gaseous component of said contaminated soil feed in said exhaust cleaning unit/afterburner;
    e) cooling the gaseous component of said contaminated soil feed;
    f) adding an adsorption powder comprising about 40% carbon, about 40% calcium hydroxide, about 10% cupric chloride impregnated carbon and about 10% $KI_3$ impregnated carbon to the gaseous component to adsorb mercury;
    g) transferring the powder-containing gaseous component to a baghouse; and
    h) releasing the substantially mercury-free gaseous component of said sample to the atmosphere.

5. The method of claim 4, wherein the gas streeam exhibits high temperature and high moisture.

6. An adsorption powder suitable for removing mercury and other heavy metals, dioxins, furans, and organic compounds from high temperature, high moisture gaseous streams, the powder comprising carbon and an effective amount of cupric chloride suitable for removing mercury.

* * * * *